Sept. 14, 1965 R. J. TROLLER 3,206,051
MATERIAL HANDLING APPARATUS
Filed May 11, 1961 2 Sheets-Sheet 1
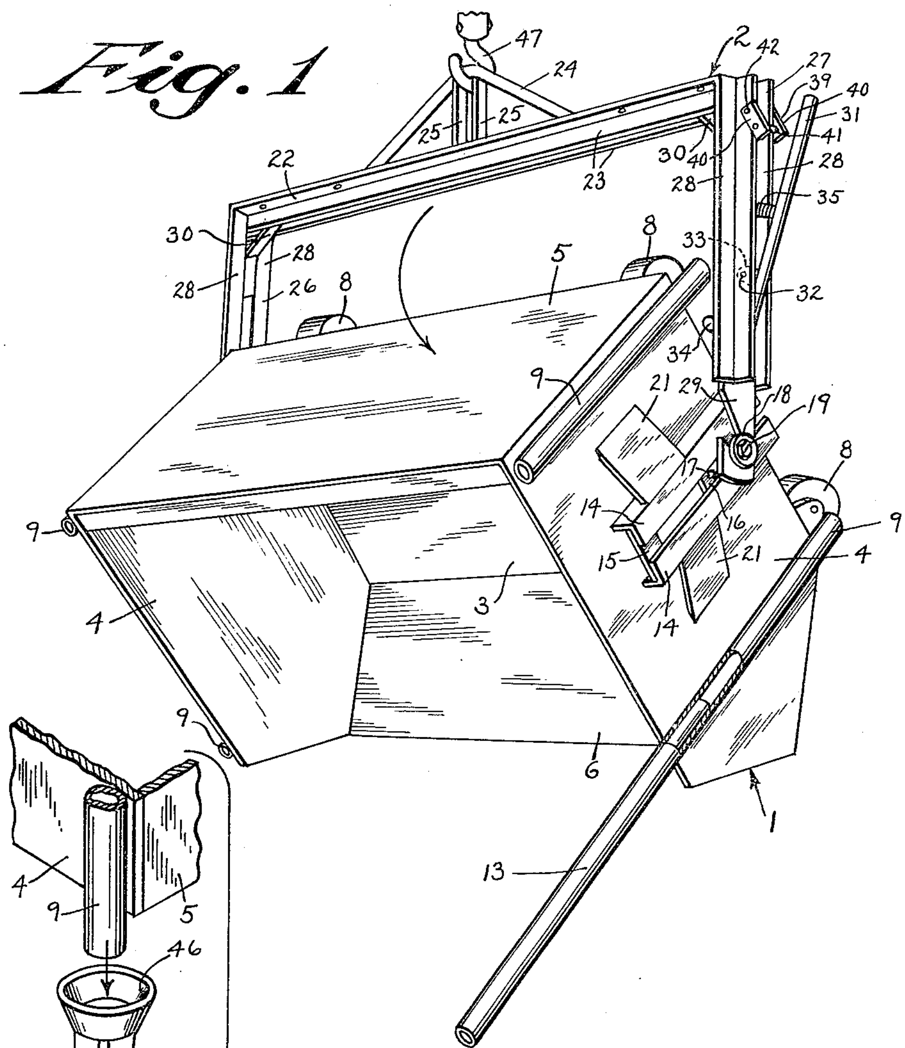
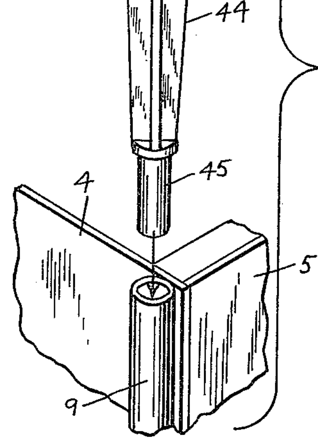
INVENTOR
ROBERT J. TROLLER
BY Arthur H. Seidel
ATTORNEY MATERIAL HANDLING APPARATUS
Filed May 11, 1961 2 Sheets-Sheet 2
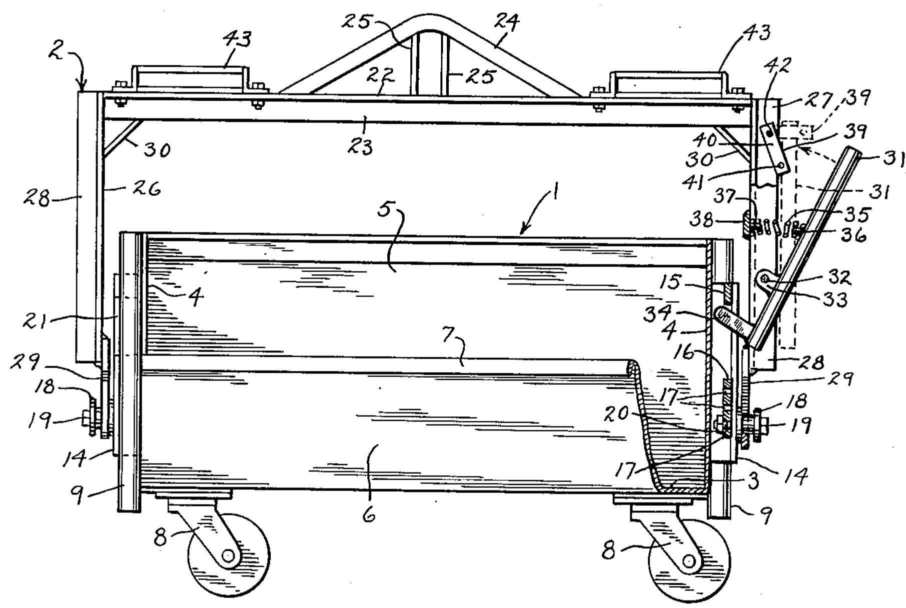
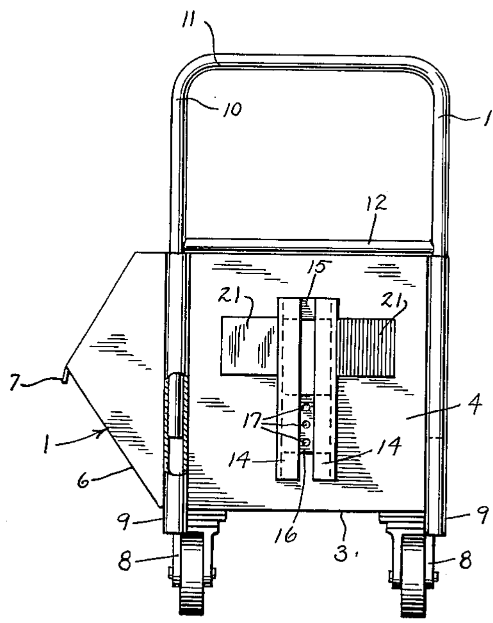
INVENTOR
ROBERT J. TROLLER
BY Arthur H. Seidel
ATTORNEY United States Patent Office 3,206,051

Patented Sept. 14, 1965

3,206,051

MATERIAL HANDLING APPARATUS

Robert J. Troller, Madison, Wis., assignor to Coolant Equipment Corporation, Verona, Wis., a corporation of Wisconsin Filed May 11, 1961, Ser. No. 109,305
3 Claims. (Cl. 214—300)

This invention relates to material handling apparatus and it more specifically resides in an assembly comprising a receptacle such as a dump cart provided with trunnions at opposite sides and a slotted catch, together with a dumping frame having a pair of arms with hooked ends that engage said trunnions and latching means adapted to engage the catch when the receptacle is in an upright position within the frame, and said latching means being further adapted to be released from the catch to permit pivot of the receptacle about the trunnions for emptying the contents.

Material handling apparatus finds use in industrial plants for the handling of waste products, such as chips and scraps, and for the handling and storing of small parts. It is desirable that such apparatus be constructed so that it may be lifted, as by an overhead crane or fork-lift truck, for transportation and subsequent dumping without necessitating removal from the hoisting device. This results in efficient handling of material that saves both time and labor.

One embodiment of this invention includes a wheeled dump cart adapted to be engaged or received by a dumping frame supported upon a power hoisting apparatus. Such engagement may be effected only while the dump cart is supported in an upright position on a support such as a floor or platform. The dumping frame includes latching means which are engaged in a catch provided on the dump cart to retain the dump cart in an upright position while the assembly is being carried to insure that the contents of the dump cart will not be prematurely dumped. When it is desired to dump the contents of the cart, the latching means may be manually disengaged and the dump cart will pivot about its points of support within the dumping frame, without requiring removal from the hoisting equipment. After dumping, the dump cart may swing upright from its own momentum or may be assisted back to an upright position. In either event, as the dump cart returns to an upright position the latching means is automatically re-engaged so that the dump cart is ready to be transported to a collection or storage site for future use.

The dump cart is further adapted to be manually moved from site to site and to be maneuvered into collecting position adjacent a machine tool apparatus, such as a lathe, milling machine, or other apparatus producing waste chips. Manual movement is accomplished by the provision of a plurality of swivel casters mounted on the underside of the dump cart, and a removable handle is provided to assist in such manual movement.

It is often necessary to store loaded or unloaded dump carts for a period of time. It is most desirable in such cases that the dump carts be stacked vertically to conserve floor space. To provide for such an eventuality, the dump cart is adapted to be so stacked by the simple addition of stacking brackets between each dump cart.

It is, therefore, an object of this invention to provide a material handling apparatus which may be carried in a locked, upright position and which may be dumped without rehandling.

It is another object of this invention to provide a material handling apparatus including a receptacle which is restrained in an upright position within a dumping frame by latching means during transportation thereof, which pivots to dump its contents upon release of the latching means and which is automatically re-engaged by the latching means when righted.

It is still another object of this invention to provide a material receptacle which is manually movable or transportable by power equipment.

It is a further object of this invention to provide a dumping frame which releasably engages a receptacle for transportation thereof and which includes releasable latching means which automatically re-engages the receptacle after the dumping operation has been completed.

It is still a further object of this invention to provide a receptacle which may be stacked vertically in an upright position.

The foregoing and other objects of this invention will appear from the description to follow. In the description reference is made to the accompanying drawings which form a part hereof and in which there is shown by way of illustration, and not of limitation, a specific embodiment in which the invention resides.

In the drawings:

FIG. 1 is a view in perspective of a dump cart assembly embodying the invention showing the cart in dumping position.

FIG. 2 is a front elevation view of the dump cart assembly with portions thereof broken away to illustrate the latching means, FIG. 3 is a side elevation view of the dump cart with a removable push handle in place, and FIG. 4 is an exploded view of a portion of two dump carts illustrating the apparatus used in stacking the dump carts.

Referring to the drawings, and particularly to FIG. 1, the material handling apparatus is comprised of a dump cart 1 and a dumping frame 2. The dump cart 1 includes a bottom plate 3 to which are joined oppositely disposed end walls 4 and side walls 5 and 6. The side wall 6 extends outwardly from the bottom plate 3 at an oblique angle thereto and extends to a vertical height substantially less than that of the end walls 4 to thereby present a lowered profile to facilitate filling and emptying of the dump cart 1. The free edge of the side wall 6 is bent downwardly and outwardly to form a dumping lip 7.

Swivel casters 8, preferably provided with rubber wheels, are mounted on the underside of the bottom plate 3 at each corner thereof to permit manual movement of the dump cart 1. A pair of spaced tubular corner posts 9 are affixed to each of the end walls 4, and each post 9 extends downwardly past the bottom plate 3 adjacent one corner thereof. Each pair of posts 9 is adapted to telescopically receive respective leg portions 10 of a removable U-shaped push handle 11 (see FIG. 3). The handle 11 is provided with a transverse member 12 extending between the leg portions 10 and which acts as a stop for positioning the handle 11 and further increases the strength and rigidity of the handle 11. Each post 9 is also adapted to telescopically receive a dumping lever 13, the purpose of which will hereinafter be described.

Referring to FIGS. 2 and 3, each end wall 4 is provided with latch receiving means in the form of a catch comprised of a pair of spaced keepers 14 which extend vertically along the outer surface of the end wall 4 centrally of the posts 9. The keepers 14 are in the form of angle members attached to the end wall 4 along the edge of one leg so that the keepers 14 are spaced outwardly of the end wall 4. A tie bar 15 may be attached to the inner surfaces of the outstanding legs of the keepers 14 to add structural rigidity to the catch. A trunnion plate 16 is also affixed to the interior surfaces of the outstanding legs of the keepers 14 adjacent the lower ends thereof, and that portion of the trunnion plate 16 which lies in the space defined by the keepers 14 is provided with a plurality of vertically spaced holes 17. A trunnion 18 is secured to the trunnion plate 16 by a bolt 19 which is received in a central bore provided in the trunnion 18 and further received in one of said holes 17. A suitable nut 20 is employed to secure the bolt 19 and trunnion 18 in position. If desired, the holes 17 may be tapped to receive the bolts 19 in threaded engagement, thereby eliminating the nuts 20. An inclined latch ramp 21 is secured along one edge to the apex of each keeper 14 and extends laterally toward the end wall 4 to which it is joined at its opposite edge.

The dumping frame 2 is comprised of a cross bar designated generally by the numeral 22, which is formed from a pair of spaced angle members 23. A lifting loop 24 formed of a suitably bent tubular material is affixed at either end to the opposed surfaces of the angle members 23. A pair of spaced center strips 25 are each attached at one end to the underside of the lifting loop 24 and extend downwardly between, and are secured to, the opposed surfaces of the angle members 23.

The dumping frame 2 also includes a pair of spaced arms designated generally by the numerals 26 and 27. The arms 26 and 27 are each formed of a pair of spaced angle members 28 attached at one end to respective ends of the angle members 23 of the cross bar 22. A hook 29 is attached to each pair of angle members 28 adjacent their lower extremities and is adapted to engage a respective one of said trunnions 18. A gusset plate 30 is employed at the junction between each arm portion 26 and 27 and the cross bar 22 and is attached at one end to the opposing surfaces of the angle members 23 and at the other end to the opposing surfaces of the angle members 28. Thus, the angle members 23 are connected by the lifting loop 24, the center strips 25 and the gusset plates 30, while the angle members 28 are connected by the hooks 29 and the gusset plates 30, thereby providing a strong and rigid dumping frame 2.

The arm 27 is provided with latching means which includes a trigger lever 31 pivotably mounted between the angle members 28 on a pin 32 which extends between the opposed legs of the angle members 28 and which is received in a bushing 33 provided on the trigger lever 31 intermediate its ends. An inwardly extending latch pin 34 is affixed to the trigger lever 31 adjacent its lower end, and is adapted to be received by the catch within the slot defined by the spaced, outwardly extending keepers 14. The latch pin 34 affixed to the trigger lever 31 is urged normally inwardly by a spring 35 disposed above the pin 32 which is seated at one end about a projection 36 on the trigger lever 31 and at the other end about a projection 37 disposed between the angle members 28 and attached to a plate 38 secured to the pair of angle members 28. Therefore, the spring 35 urges the upper portion of the trigger lever 31 outwardly to position the latch pin 34 toward the end wall 4 where it may be restrained between the keepers 14.

A trigger lever restraining mechanism 39 which includes a pair of spaced side plates 40 connected by a restraining pin 41 is pivotably mounted adjacent the upper end of the arm 27 on a pin 42, and is adapted to be engaged about the trigger lever 31 to restrain the same in an upright position, as indicated by the dotted lines in FIG. 2.

The cross bar 22 may be provided with a pair of lifting pods 43 bolted to the angle members 23 to facilitate the use of a fork-lift truck in transporting the dump cart 1 and dumping frame 2. Stacking brackets 44 permit the stacking of a plurality of dump carts 1. Each stacking bracket is provided at one end with a stub shaft 45 which is adapted to be telescopically received within the upper end of a corner post 9, and is further provided at its upper end with an outwardly flared cup portion 46 adapted to receive a downwardly extending corner post 9 (see FIG. 4).

With the dumping frame 2 disengaged from the dump cart 1, the cart 1 may be maneuvered manually into collecting position, such as adjacent a lathe or mill, or at the end of a conveyor. The swivel casters 8 permit maximum maneuverability of the dump cart 1, and the removable handle 11 may be positioned within the corner posts 9 at either end of the cart 1 for convenience in pushing the cart 1. The low profile of the side wall 6 provides for clearance under chip pans or work benches for ease in loading the cart 1.

When it is desired to transport or dump the cart 1, the dumping frame 2 may be conveyed into position over the dump cart 1 by a fork-lift truck or by an overhead hoist. If a hoist is employed, the hoist hook 47 engages the lifting loop 24 of the dumping frame 2 between the center strips 25 as shown in FIG. 1. To permit unobstructed engagement of the hooks 29 about the trunnions 18, it is necessary to so position the latch pin 34 that it will clear the keepers 14. This is accomplished by holding the trigger lever 31 in a vertical position against the arm 27, either manually or by the use of the trigger lever restraining mechanism 39. After engaging the hooks 29 about the trunnions 18, the trigger lever 31 is released and the spring 35 will rotate the lever 31 to engage the latch pin 34 within the slot defined by the keepers 14. With the dump cart 1 supported within the frame 2 and the latch pin 34 received between the keepers 14, the cart 1 is positively locked in position and may be transported without fear of accidental tipping and dumping of the contents.

Dumping of the contents of the cart 1 is accomplished by releasing the latch pin 34 from the keepers 14. Thus, simply moving the lever 31 manually into an upright position against the force of the spring 35 removes the latch pin 34 and permits the dump cart 1 to pivot about its supported trunnions 18. Because of the inclined lowered side wall 6 the dump cart 1 and its contents will, under normal conditions, have a combined center of gravity which is eccentric of the trunnions 18. Therefore, when the latch pin 34 is disengaged, such eccentricity will cause the dump cart to pivot to expel its contents without need of manual assistance. However, where it is necessary to control the rate of dumping, the dumping lever 13 may be placed in one of the corner posts 9 to permit manual control.

The center of gravity of the unloaded cart 1 is also eccentric of the trunnions 18 and, therefore, the momentum of the cart 1 after dumping is normally sufficient to cause the cart 1 to rotate through a full 360° to return to an upright position. After initial release of the latch pin 34, to allow the cart 1 to rotate it is no longer necessary to restrain the trigger lever 31 and the spring 35 will return the trigger lever 31 and attach latch pin 34 into latching position. Therefore, as the cart 1 approaches the upright position after dumping, the latch pin 34 will ride over a ramp 21 to the associated keeper 14 and then into the slot defined by the keepers 14. Thus, the latching means are automatically re-engaged and the dump cart 1 is locked in an upright position within the frame 2 for transporting the cart to any desired site.

Removal of the cart 1 from the frame 2 may be accomplished only while the cart 1 is supported from below in an upright position. Once the trigger lever 31 has been moved to a vertical position, and retained in such position either manually or by means of the trigger restraining mechanism 39, the hooks 29 may be disengaged from the trunnions 18.

The vertical position of the trunnions 18 may be adjusted to secure the most desirable position consistent with the center of gravity of the loaded dump cart 1. Adjustment of each trunnion 18 is accomplished by removing the nut 20, withdrawing the bolt 19 and trunnion 18 from one of the holes 17 provided in the trunnion plate 16 and replacing the bolt 19 and trunnion 18 into the desired hole 17.

It should be noted that the identical transporting and dumping operation described above may be carried out with the use of a fork-lift truck as the source of motive power rather than an overhead hoist. When a fork-lift truck is employed, the lifting pods 43 are secured to the cross bar portion 22 of the dumping frame 2 to receive the forks of the truck. The dump cart 1 alone may also be transported by a fork-lift truck which may lift the cart 1 by engaging the underside of the level bottom plate 3.

Other types of receptacles may also be employed in this invention. Thus, a trash collecting barrel may be fitted with a peripherally extending girdle (not shown) which includes a pair of trunnions and a catch as hereinbefore described. The dumping frame 2 would then be capable of transporting and dumping such a barrel in the manner described and with similar results.

Either loaded or unloaded dump carts 1 may be stacked vertically to eliminate floor congestion. Four stacking brackets 44 are employed between each pair of carts 1. The stub shaft 45 of the brackets 44 is placed in the upper open end of the corner posts 9 of the lower cart 1. Then, the upper cart 1 may be lowered into position with the downwardly extending ends of the corner posts 9 of the upper cart 1 resting in the cup portions 46. Thus, the brackets 44 permit adequate clearance for the casters 8 of the upper cart 1.

It will be seen from the above description that the material handling apparatus of this invention provides a device for fast and efficient handling of industrial wastes and small parts. The apparatus may be carried in a locked upright position and the content of the receptacle may be dumped without requiring rehandling. Release of the latching means is accomplished simply by moving the trigger lever into an upright position. The eccentric center of gravity causes, under normal conditions, automatic dumping and return to an upright position. The latching means is re-engaged by the catch automatically upon return of the receptacle to an upright position. The receptacle is adapted, when disengaged from the dumping frame 2, to be moved manually into position, and a plurality of receptacles may be stacked, loaded or unloaded, to conserve floor space.

I claim:

1. A material handling apparatus comprising: a dump cart including a pair of oppositely disposed walls, a pair of transversely spaced upright keepers affixed to each wall and extending outwardly thereof, vertically adjustable trunnion mounting means secured to each of said pairs of keepers, a trunnion mounted on each of said trunnion mounting means and extending outwardly of said keepers, a pair of ramps disposed on opposite sides of each pair of keepers and inclined oppositely relative to one another, each of said ramps extending from the outer surface of a respective one of said keepers transversely to the outer surface of the respective wall; and a dumping frame including a cross bar adapted to be engaged for lifting said frame, a pair of arms each extending downwardly from one end of said cross bar and each terminating in a hook adapted to releasably engage a respective one of said trunnions for pivoting of said dump cart within said dumping frame, a trigger lever pivotably mounted on one of said arms adapted to move in a plane common to said cross bar and arms, an inwardly extending latch pin attached to said trigger lever adjacent its lower end, said latch pin adapted to travel over said ramps and to be received between said keepers, and a spring connecting said trigger lever and its associated arm to urge said latch pin inwardly of the dumping frame.

2. A material handling apparatus comprising: a dump cart including a bottom plate, a first side wall joined perpendicularly to said bottom plate, a second side wall joined to said bottom plate and extending outwardly thereof at an oblique angle, a pair of oppositely disposed end walls joined to said bottom plate and said side walls, a pair of transversely spaced, upright keepers affixed to each end wall centrally of said bottom plate and extending outwardly of said end wall, a mounting plate extending between each pair of keepers, said mounting plate being provided with a plurality of vertically spaced holes disposed between said keepers, a trunnion received in one of said holes of each of said mounting plates, and a pair of ramps disposed on opposite sides of each pair of keepers and inclined oppositely relative to one another, each of said ramps extending from the outer surface of a respective one of said keepers transversely to the outer surface of the respective end wall; and a dumping frame including a cross bar adapted to be engaged for lifting said frame, a pair of arms each extending downwardly from one end of said cross bar and each terminating in a hook adapted to releasably engage a respective one of said trunnions for pivot of said dump cart within said dumping frame, a trigger lever pivotably mounted on one of said arms adapted to move in a plane common to said cross bar and arms, an inwardly extending latch pin attached to said trigger lever adjacent its lower end, said latch pin adapted to travel over said ramps and to be received between said keepers, and a spring connecting said trigger lever and its associated arm to urge said latch pin inwardly of the dumping frame.

3. In a receptacle for lifting by a frame having spaced downwardly extending arms each terminating in a hook and latching means mounted on one of said arms the combination comprising: a bottom plate, a first side wall joined at right angles to said bottom plate, a second side wall of substantially reduced height joined to said bottom plate and extending outwardly thereof at an oblique angle, a pair of end walls joined to said bottom plate and to said side walls, a pair of transversely spaced upright keepers affixed to each end wall centrally of the bottom plate, a mounting plate extending between each pair of keepers and having a plurality of vertically spaced holes disposed between said keepers, a trunnion received in one of said holes in each of said mounting plates and adapted to be engaged by said hooks, and a pair of ramps disposed on opposite sides of each pair of keepers, each of said ramps extending from the outer surface of a respective one of said keepers transversely to the outer surface of the respective end wall to guide said latching means into the space between said pair of keepers for locking the receptacle in an upright position within said frame.

References Cited by the Examiner

UNITED STATES PATENTS

| | | | |
|---|---|---|---|
| 731,118 | 6/03 | Newman | 214—300 |
| 1,131,749 | 3/15 | Stuebner | 294—73 |
| 1,408,383 | 2/22 | Mosel | 294—68 |
| 1,573,130 | 2/26 | Benton | 294—73 |
| 1,794,714 | 3/31 | Kiplinger | 214—300 |
| 2,452,243 | 10/48 | Johnson | 294—73 |
| 2,796,283 | 6/57 | Grazier | 294—73 |
| 2,822,096 | 2/58 | Buratovich | 214—10.5 |
| 2,865,535 | 12/58 | Johnson | 214—314 X |
| 2,919,948 | 1/60 | Williams et al. | 294—73 |
| 2,928,562 | 3/60 | Gollnick | 214—302 |
| 2,987,198 | 6/61 | Crane | 214—10.5 |

FOREIGN PATENTS

| | | |
|---|---|---|
| 1,165,432 | 10/58 | France. |
| 1,066,142 | 9/59 | Germany. |
| 382,192 | 10/32 | Great Britain. |
| 777,986 | 7/57 | Great Britain. |

HUGO O. SCHULZ, *Primary Examiner.*

MORRIS TEMIN, *Examiner.*